United States Patent
Brueggen

(10) Patent No.: US 8,370,582 B2
(45) Date of Patent: Feb. 5, 2013

(54) MERGING SUBSEQUENT UPDATES TO A MEMORY LOCATION

(75) Inventor: Chris Brueggen, Allen, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 379 days.

(21) Appl. No.: 12/693,742

(22) Filed: Jan. 26, 2010

(65) Prior Publication Data

US 2011/0185104 A1 Jul. 28, 2011

(51) Int. Cl.
G06F 12/12 (2006.01)

(52) U.S. Cl. .............. 711/140; 711/141; 711/E12.062; 711/E12.069

(58) Field of Classification Search ................ None
See application file for complete search history.

(56) References Cited

U.S. PATENT DOCUMENTS

| | | | |
|---|---|---|---|
| 6,587,929 B2 * | 7/2003 | Henry et al. ............... | 711/141 |
| 2007/0067567 A1 * | 3/2007 | Jiao et al. .................. | 711/118 |
| 2008/0263239 A1 | 10/2008 | Brueggen | |

OTHER PUBLICATIONS

Thread: what is RMW (Read Modified Write). In edaboard.com [online]. Jul. 4, 2008 [retrieved on Mar. 23, 2012]. Retrieved from the Internet: <URL:http://www.edaboard.com/thread129558.html>.*
Zhou, Yuanyuan. Algorithms. Usenix [online]. Apr. 4, 2001 [retrieved on Mar. 23, 2012]. Retrieved from the Internet: <URL:http://static.usenix.org/events/usenix01/full_papers/zhou/zhou_html/node3.html>.*

* cited by examiner

*Primary Examiner* — Edward Dudek, Jr.
*Assistant Examiner* — Ralph A Verderamo, III

(57) ABSTRACT

A method of merging subsequent updates to a memory location includes receiving, at a first stage in an update pipeline, a first request to update a status word at a first address of a cache memory and receiving the status word from the cache memory. The method continues with determining, at a stage subsequent to the first stage, that a second request to update the status word has been received. Further included is updating the status word according to the first and second requests to form an updated status word and writing the updated status word to the cache memory.

10 Claims, 2 Drawing Sheets

MERGING SUBSEQUENT UPDATES TO A MEMORY LOCATION

BACKGROUND

In most modern computer systems, a cache memory is used to increase the execution speed of the computer's processor. Usually, cache memory is built into or very close to a computer processor and is under the exclusive control of the processor. Although cache memory is much smaller than the computer's program or disk memory, cache memory can be accessed by the processor much faster than either program or disk memory.

As the computing system moves from task to task, data copied from other memories into cache memory can quickly cause all of the memory addresses within the cache to become occupied, thus requiring the cache controller to replace valid cache entries so that new data necessary to support upcoming scheduled tasks can be accommodated. To optimize the performance of the computing system, algorithms are used to determine those entries within the cache that are unlikely to contain data that the processor will use again. When a cache entry must be replaced, a selection is made based on which entries fit these criteria. This maximizes performance by increasing the percentage of cache hits.

One such algorithm uses information that pertains to whether data at a particular cache memory address has been recently used by one or more processors in the computer system. If data at the particular cache memory address has not been recently used by a processor, it may be unlikely that such data will be needed to perform a current or upcoming task. The manner in which such techniques are implemented is the subject of significant development efforts as computer system designers explore ways of managing cache memory without negatively impacting the execution speed of processing tasks.

DESCRIPTION OF THE EMBODIMENTS

At least some embodiments of the invention bring about the capability to update status words that denote whether a particular cache line stored in a cache memory has recently been used by one or more computer processors in a computing system. Among other things, embodiments of the invention address the condition in which multiple updates to the same status word occur within a short period of time (such as a few clock cycles). Conventional cache memory architectures require that upon receipt of a second update to a status word for which a first update has already been received, the update pipeline must be stalled until the first update (including writing the updated status word to cache memory) can be performed. Upon the completion of the first update, the pipeline is restarted and the subsequent update to the status word is performed, which generally includes a second memory write. However, the constant stalling and restarting of the update pipeline can negatively impact computer system performance.

As described in the embodiments of the invention illustrated herein, the inventor has determined a method and logic module that performs one or more subsequent updates to a cache line status word while a previous update to the same status word is being processed in the status word update pipeline. Thus, two or more updates to the same status word can be merged into a single write operation. This has the effect of increasing the processor speed since unnecessary writes to cache memory are avoided. Further, there is no need to stall and then to subsequently restart the cache memory update pipeline.

Figure 1:
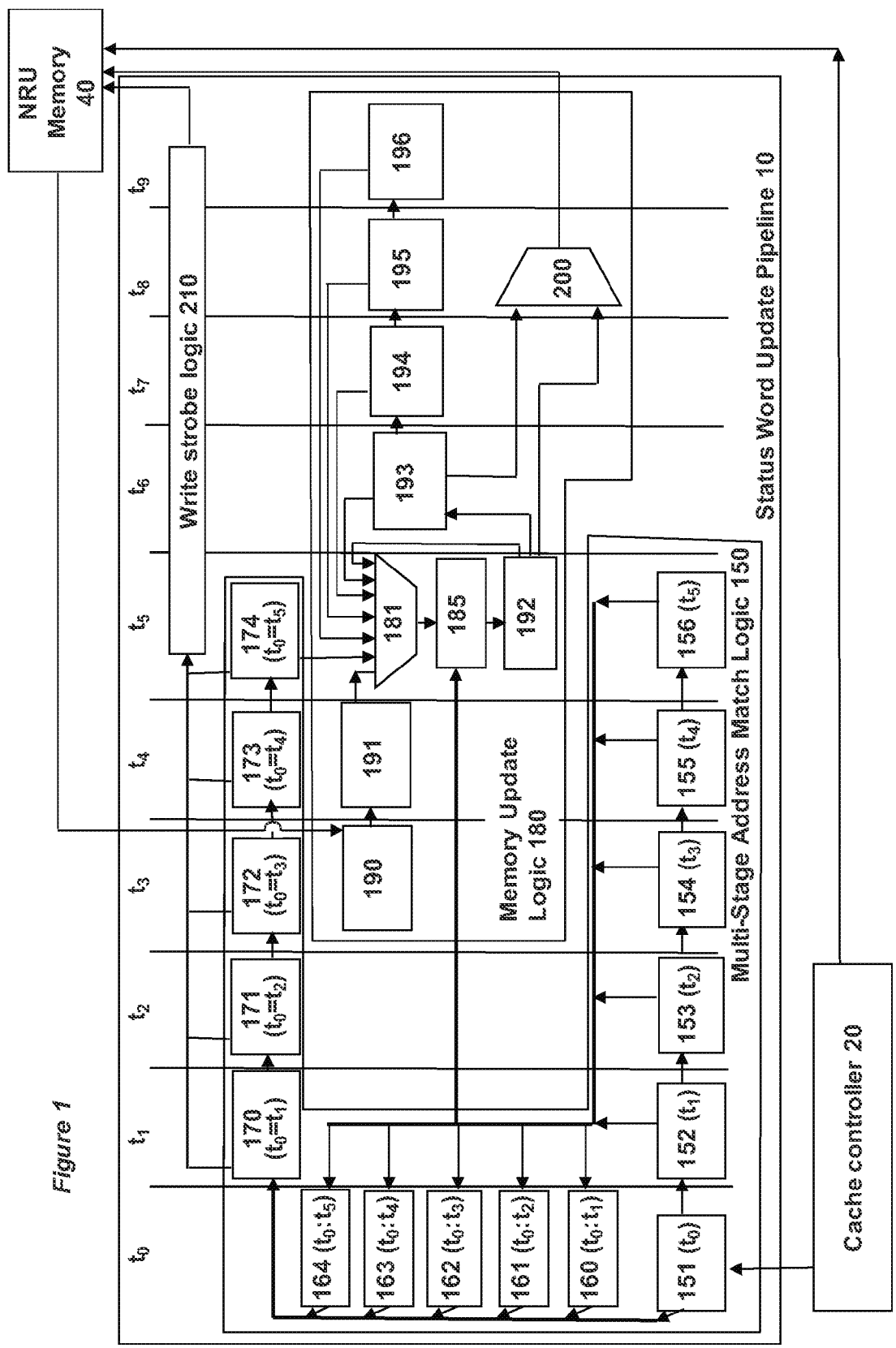
FIG. 1 represents a logic module and related components for merging subsequent updates to a memory location according to an embodiment of the invention.

FIG. 1 represents a logic module and related components for merging subsequent updates to a memory location according to an embodiment of the invention. In FIG. 1, status word update pipeline 10 operates under the control of cache controller 20. The function of cache controller 20 and status word update pipeline 10 is to perform updates to not-recently-used (NRU) memory 40. In one embodiment of the invention, NRU memory 40 includes the NRU status words that denote whether a particular processor in a multiprocessor computer environment has recently owned or otherwise exercised exclusive control over a particular cache line stored in cache memory.

In this embodiment, a set-associative cache memory architecture is employed in which each address of NRU memory 40 includes status words for 12 individual cache memory blocks, generally referred to as cache "ways". The inventor contemplates that the status indicator for each "way" occupies a particular location in the status word. Thus, for example, positions (or bits) one and two of the status word might indicate whether a processor has recently used (or owned) a cache line stored in way one. Positions three and four may indicate whether a processor has recently used the cache line stored in way two, and so forth.

In FIG. 1, status word update pipeline 10 represents a set of data processing elements connected in series and controlled by a clock (not shown) so that the output of one processing operation (or stage) provides an input for the next operation (or stage) at a following clock cycle. In this embodiment, pipeline 10 includes approximately nine stages, although nothing prevents the use of a smaller status word update pipeline having fewer stages (such as four or five) or a larger status word update pipeline having a greater number of stages (such as 15, 20, or more).

At a first stage ($t_0$) of the pipeline, a command to read data from a particular location in not-recently-used (NRU) memory 40 is received. As the data from the location in NRU memory 40 is clocked through update pipeline 10, if additional requests to update the same status word stored in NRU memory 40 are received by pipeline 10, the additional updates can be combined or merged with the first update so that only a single write to NRU memory 40 is necessary.

At time $t_0$, an address from cache controller 20 is presented to address buffer $t_0$ (151) of multi-stage address match logic 150. Within multi-stage address match logic 150 is address buffer $t_0$ (151), which stores the received address for comparison with addresses stored in address buffer $t_1$ (152), address buffer $t_2$ (153), address buffer $t_3$ (154), address buffer $t_4$ (155), and address buffer $t_5$ (156), received during previous clock cycles. During a subsequent clock cycle, such as time $t_1$, pipeline 10 issues the read command to NRU memory 40, which conveys the status word from the appropriate location of NRU memory 40 to data buffer 190 of memory update logic 180. At time $t_1$, the address received at time $t_0$ progresses from stage 0 ($t_0$) to stage 1 ($t_1$) of pipeline 10, which receives a second address at stage 0 ($t_0$) from cache controller 20. At time $t_2$ the address received at time $t_0$ progresses to stage 2 of the pipeline. Also at time $t_2$, pipeline 10 receives a third address at stage 0 from cache controller 20. Thus, at each time increment, the address received at a given stage of the pipeline shifts to the next stage.

Multi-stage address match logic 150 compares the address received at time $t_0$ with previously-received addresses being processed by pipeline 10. Thus, for the example of FIG. 1, comparator 160 compares the contents of address buffer 151 with the contents of address buffer 152 ($t_0$: $t_1$). Comparator 161 compares the contents of address buffer 151 with the contents of address buffer 153 ($t_0$: $t_2$). Comparator 162 compares the contents of address buffer 151 with the contents of address buffer 154 ($t_0$: $t_3$). Comparator 163 compares the contents of address buffer 151 with the contents of address buffer 155 ($t_0$: $t_4$). And, comparator 164 compares the contents of address buffer 151 with the contents of address buffer 155 ($t_0$: $t_5$).

In the event that the address stored in address buffer 151 ($t_0$) is not equal to the address in any of address buffers 152, 153, 154, 155, or 156, each output of address match 170, 171, 172, 173, and 174 remains unasserted (logic 0). Thus, feedback mux 181 of memory update logic 180 remains in a quiescent state. In turn, no further updates to data update 185 are performed, and the updated data can be registered by way of data buffer 192 and 193 and multiplexed out of status word update pipeline 10 by way of write mux 200. In the embodiment of FIG. 1, write mux 200 includes the capability of writing at either of time periods $t_6$ and $t_7$ so as to avoid collisions with other operations such as memory reads from NRU memory 40. Thus, during the selected time period, write strobe logic 210 is asserted so that data from write mux 200 can be conveyed to NRU memory 40.

In the event that the results of address comparison operations performed by comparator 160, 161, 162, 163, or 164 indicate a match between the address stored in address buffer 151 and any one of the addresses stored in address buffers 152, 153, 154, 155, and 156, an appropriate output of one of address match 170, 171, 172, 173, and 174 is conveyed to write strobe logic 210. The assertion of this output inhibits the write command to NRU memory 40 so that a second update to the status word can be performed.

In one of numerous examples made possible by the embodiment of FIG. 1, say for a moment that data buffer 192 stores the status word from the memory address of NRU memory 40 stored in address buffer 152 ($t_1$). Further, say that the address stored in address buffer 151 ($t_0$) equals the address stored in buffer 152. For this example, the results of comparator 160 (perhaps a logic 1) are conveyed to address match 170. In turn, address match 170 inhibits write strobe logic 210 so that write mux 200 refrains from writing the corresponding status word into NRU memory 40. Feedback mux 181 is then commanded to merge the contents of data buffer 192 with incoming data, perhaps from data buffer 191, by way of data update 185. The updated status word, can then be held in data buffer 192 during a subsequent clock cycle.

In the event that during the next several clock cycles, the comparison operations performed by comparators 160, 161, 162, 163, and 164 do not result in an additional address match, write strobe logic 210 is activated so that the updated status word can be written to NRU memory 40 by way of write mux 200 using a single memory write operation.

In the case of multiple comparators indicating an address match, meaning that more than two updates to the same status word are present in status word update pipeline 10, feedback mux 181 can be controlled by way of a priority selection circuit as described in United States Published Patent Application 20080263239, which is hereby incorporated in its entirety, except for those sections, if any, that are inconsistent with the present disclosure. In this instance, the newest update present in data buffers 190, 191, 192, 193, 194, 195, or 196, is fed back for merging with the most recent update.

As an example that makes use of a priority selection scheme, suppose that comparators 164, 162, and 160 indicate the contents of address buffer 151 ($t_0$) is equal to the contents of address buffer 154 ($t_3$) which equals the contents of address buffer 156 ($t_5$). In this example, as the status words progress through memory update logic 180, the first-received status word, $t_5$, which corresponds to the address stored in address buffer 156, is used to update the second-received status word, $t_3$, which corresponds to the address stored in address buffer 154. The now-updated status word is then used to update the third-received status word, $t_0$, which corresponds to the address stored in address buffer 151. Thus, in this instance, the use of a priority selection circuit ensures that the third-received status word is not directly affected by the first-received status word. The first-received status word only indirectly affects the third-received status word by virtue of the merging of the first- and second-received status words.

Figure 2:
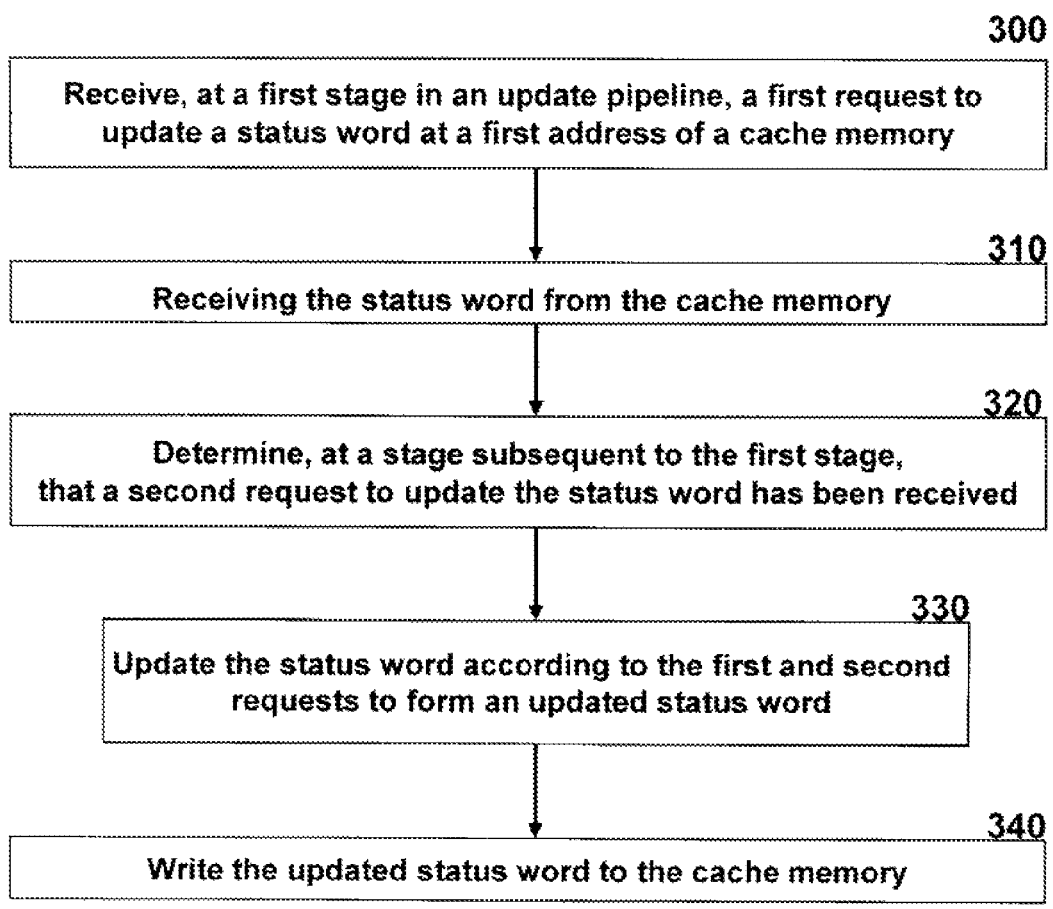
FIG. 2 is a flowchart for a method of merging subsequent updates to a memory location according to an embodiment of the invention.

FIG. 2 is a flowchart for a method of merging subsequent updates to a memory location according to an embodiment of the invention. Although the logic module and related components whose operation has been described with reference to FIG. 1, other logic modules, state machines, and so forth may be used to perform the method. The method begins at step 300, which includes receiving, at a first stage of an update pipeline, a first request to update a status word at a first address of a cache memory. In one embodiment of the invention, the status word includes indicators that denote whether a particular processor in a multiprocessor computing environment has recently owned a certain line of cache memory. These may include NRU indicators (such as previously described) or may include least-recently-used (LRU) indicators denoting that a cache line has been used the least when compared to other lines of cache memory.

The method continues at step 310, which includes receiving the requested status word from the cache memory. Step 320 includes determining, at a state subsequent to the first stage, that a second request to update the status word has been received. Step 320 may include comparing a first address with a second address and determining that the two addresses are equal, thus pertaining to the same status word. At step 330, the status word is updated according to the first and second requests.

Step 330 may include storing a status word that has been updated according to the first request and performing a second update to the updated status word according to the second request. Step 330 may further include receiving a third request to update the status word and using a priority scheme to further update the status word according to the third request. The method concludes at step 340, which includes writing the twice-updated status word to the first address of the cache memory.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of merging subsequent updates to a memory location, comprising:
   receiving, at a first stage in an update pipeline, a first request to update a status word at a first address of a cache memory;
   receiving the status word from the cache memory;
   determining, at a stage subsequent to the first stage, that a second request and a third request to update the status word have been received;
   updating the status word according to the first and second requests to form an updated status word;
   using a priority scheme to further update the status word according to the third request; and
   writing the updated status word to the cache memory.

2. The method of claim 1, wherein the determining step further comprises comparing the first address with an address associated with the second request to update the status word.

3. The method of claim 1, wherein the updating step further comprises:
   storing a status word that has been updated according to the first request in a buffer; and
   applying, to the status word that has been updated according to the first request, a second update that accords with the second request.

4. The method of claim 1, wherein the writing step includes writing the updated status word back to the first address.

5. The method of claim 1, wherein the cache memory holds indicators that are one of the group consisting of not-recently-used indicators and least-recently-used indicators.

6. The method of claim 5, wherein the indicators pertain to whether one of a plurality of processors in a multiprocessor computer system has recently referred to a line of cache memory stored in a particular cache way.

7. A system for detecting plurality of updates to a status word in a cache memory, comprising:
   a cache controller that conveys a memory address to a status word update pipeline;
   multi-stage address match logic, within the status word update pipeline, wherein the multi-stage address match logic comprises priority selection in which a first-received status word is used to update a second received status word to form an updated status word, and wherein the updated status word is used to update a third-received status word while the first-received and second-received status words are present in the status word update pipeline.

8. The system of claim 7, wherein the status word comprises indicators selected from the group consisting of not-recently-used indicators and least-recently-used indicators.

9. The system of claim 8, wherein the indicators indicate that one of a plurality of processors in a multiprocessor computer system has recently referred to a line of cache memory stored in a particular cache way.

10. The system of claim 7, wherein the write operation includes writing an updated status word back to the memory address conveyed by the cache controller.

* * * * *